United States Patent
Han et al.

[19]

[11] Patent Number: 5,820,136
[45] Date of Patent: Oct. 13, 1998

[54] QUICK RELEASE INTEGRATED COLLET AND CHUCK DEVICE

[75] Inventors: Erik G. Han; Edward H. Martin, both of Anderson; Kenneth M. Montjoy, Seneca; William M. Aultman, Pickens; Robert A. Grogan, Salem, all of S.C.

[73] Assignee: Power Tool Holders Incorporated, Wilmington, Del.

[21] Appl. No.: 740,101

[22] Filed: Oct. 24, 1996

[51] Int. Cl.[6] .............................. B23B 31/14; B23B 31/20
[52] U.S. Cl. ...................... 279/131; 279/46.7; 279/46.9; 279/51; 279/58; 279/904
[58] Field of Search .................. 279/46.7, 46.9, 279/51, 54, 58, 131, 904

[56] References Cited

U.S. PATENT DOCUMENTS

| | | | |
|---|---|---|---|
| 2,367,863 | 1/1945 | Grey | 279/131 |
| 2,495,050 | 1/1950 | Banker | 279/51 |
| 2,686,682 | 8/1954 | Csaki | 279/131 |
| 3,625,528 | 12/1971 | Sage | 279/131 |
| 4,017,203 | 4/1977 | Marantette et al. | 279/131 |
| 4,032,163 | 6/1977 | Holt | 279/37 |
| 5,324,050 | 6/1994 | Kanaan | 279/46.7 |

*Primary Examiner*—Steven C. Bishop
*Attorney, Agent, or Firm*—Dority & Manning

[57] ABSTRACT

A quick release chuck device includes a body member having a frustoconical chamber defined therein with a collet device operably housed in the chamber. At least two longitudinally extending members are disposed equally spaced around the circumference of the body member and are pivotally mounted relative to the body member at pivot points near a front or first end of the longitudinal members. The longitudinal members have a second end opposite the first end wherein the second ends are moveable radially outward from the body member as the body member is rotated in an operational mode of the device. The first ends of the longitudinal members engage the collet device and force the collet device longitudinally into the frustoconical chamber when the second ends are moved radially outward by centrifugal force as the body member is rotated.

20 Claims, 8 Drawing Sheets

QUICK RELEASE INTEGRATED COLLET AND CHUCK DEVICE

BACKGROUND OF THE INVENTION

The present invention relates to a chuck device for holding tool bits to a drive shaft of the power tool, and more particularly to a quick release chuck device incorporating a collet which is particularly useful on high speed devices, such as routers.

A typical conventional system used on portable stationary routers, laminate trimmers, or dry wall cutters utilize a collet tool holding device having a tapered collet that conforms to the hollow cone of the collet chuck or router motor shaft. Typically, a threaded nut is provided having a conical cam surface which matches the conical surface of the outer collet face. During operation of this type of device, the drive spindle or chuck of the machine tool must be held stationary in order to tighten the collet nut sufficiently. For this reason, most router chucks, for example, have spindle locks or are provided with an extra wrench that fits the chuck body or shaft. Similarly, to release the tool, the machine shaft or chuck body must be held stationary while the nut is loosened in the counterclockwise direction. This known conventional system has a number of drawbacks, for example, the tightening and loosening procedure has proven to be cumbersome and requires a means, such as a separate wrench, for locking the spindle shaft. Also, with the conventional systems, the operator must physically tighten the nut onto the collet in very tight or close proximity to the sharp cutting edges of the tool bit carried by the collet.

Various attempts have been made in the art to provide an improved chuck device for high speed machine tools, particularly routers and the like. U.S. Pat. No. 5,511,801 issued to Kanaan et al., for example, provides a significant improvement in the art. The '801 patent discloses an integrated collet and chuck device which is actuated by turning a sleeve relative to a body member, with the sleeve having a nut fixed therein. The nut engages a screw member which is rotatably concentric within the nut. Rotation of the nut drives the screw member in the longitudinal direction and the screw member engages a collet thereby causing the collet to grip on a tool shank.

U.S. patent application Ser. No. 08/456,184, now abandoned to Kanaan et al. discloses another quick release chuck device which is particularly useful on high speed tools. This device is actuated by a spring biased sleeve member which is moveable relative to a body member. Tapered pins are seated within tapered slots defined in the body member and contact and grip a tool shank inserted into the device in a spring biased position of the sleeve member. U.S. Pat. No. 4,692,073 to Martindell describes a chuck apparatus for power bits utilizing a spring biased sleeve disposed about the drive spindle for axially securing the power bit to the chuck apparatus.

The present invention provides an improvement to the state of the art of quick release chuck devices utilizing a collet.

OBJECTS AND SUMMARY OF THE INVENTION

Therefore, a principal object of the present invention is to provide a quick change chuck device incorporating a collet for securing a tool bit or working device to a drive spindle of a machine tool.

A further object of the invention is to provide a integrated collet and chuck device which does not require a threaded or rotational screw member or nut for actuating the collet.

And yet a further object of the present invention is to provide a centrifugal force actuated collet and chuck device.

Still another object of the present invention is to provide an improved chuck device for machine tools, particularly high speed machine tools such as routers, laminate trimmers, dry wall cutters, and the like.

Additional objects and advantages to the invention will be set forth in part in the description which follows and in part will be obvious from the description, or may be learned through practice of the invention. The objects and advantages of the invention may be realized and obtained by means of the instrumentalities and combinations particularly pointed out in the appended claims.

To achieve the objects, and in accordance with the purposes of the invention, a quick release chuck device is provided which includes a body member having a frusto-conical chamber defined in the body member for receipt of a conventional collet device operably housed in the frusto-conical chamber. At least two longitudinally extending members are disposed equally spaced around the circumference of the body member. These longitudinal members are pivotally mounted relative to the body member at pivot points generally nearer to a first end of the members. The longitudinally extending members have a second end opposite the first end which is radially moveable outward from the body member as the body member is rotated in an operational mode of the chuck device. For example, when the body member is mounted to a drive spindle of a power tool, such as a router, and the drive spindle is rotationally driven, the longitudinal members will move radially away from the body member as they pivot about the pivot points. As the second end of the longitudinal members move radially outward, the first ends of the longitudinal members on the opposite sides of the pivot points will engage the collet device and force the collet device longitudinally into the frustoconical chamber thereby causing the collet device to grip a tool shank carried therein.

The second ends of the longitudinally extending members preferably comprise a weighted portion or section and have a greater weight than the first ends. In this manner, the gripping force of the mechanism is enhanced. Preferably, the weighted ends are formed integral with the longitudinally extending members.

In a preferred embodiment, the device further comprises a sleeve member longitudinally moveable relative to the body member. The sleeve member comprises a surface for contacting the longitudinally extending members as the sleeve member is manually moved relative to the body member. Thus, movement of the sleeve member relative to the body member causes the longitudinally extending members to move radially towards the body member and the first ends of the members to thus move radially away from the body member causing the collet device to be pulled out of the frustoconical chamber so that a tool shank can be inserted into the collet device. The sleeve member is preferably spring biased by means of a spring operably located between the sleeve member and a cap member fixed to the body member. In this manner, the sleeve member moves longitudinally over a limited range relative to the cap member against the force of the resilient member.

It may also be preferable to include resilient members, such as springs, operably disposed between the longitudinally extending members and the body member. These spring members provide an initial radially outward bias to the second ends of the longitudinally extending members so that the device has an initial degree of gripping strength to hold a tool bit therein even when the power tool is in a stationary non-driven mode. The longitudinally extending members are manually moveable against the force of the spring members, for example through actuation of the spring biased sleeve member, so that a tool shank can be manually inserted into the collet device.

The device also includes means for mounting the body member to a drive spindle of a machine tool. Any conventional mounting means may be utilized in this regard.

Also, it should be understood that any conventional collet device can be utilized in the present invention.

The accompanying drawings, which are incorporated and constitute a part of the specification, illustrate embodiments of the invention and, together with the description serve to explain the principles of the invention.

DESCRIPTION OF THE PREFERRED EMBODIMENTS

Reference will now be made in detail to the presently preferred embodiments of the invention. One or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations that come within the scope of the appended claims and their equivalents. The numbering of components in the drawings is consistent throughout the application, with the same components having the same number in each of the drawings.

Figure 6:
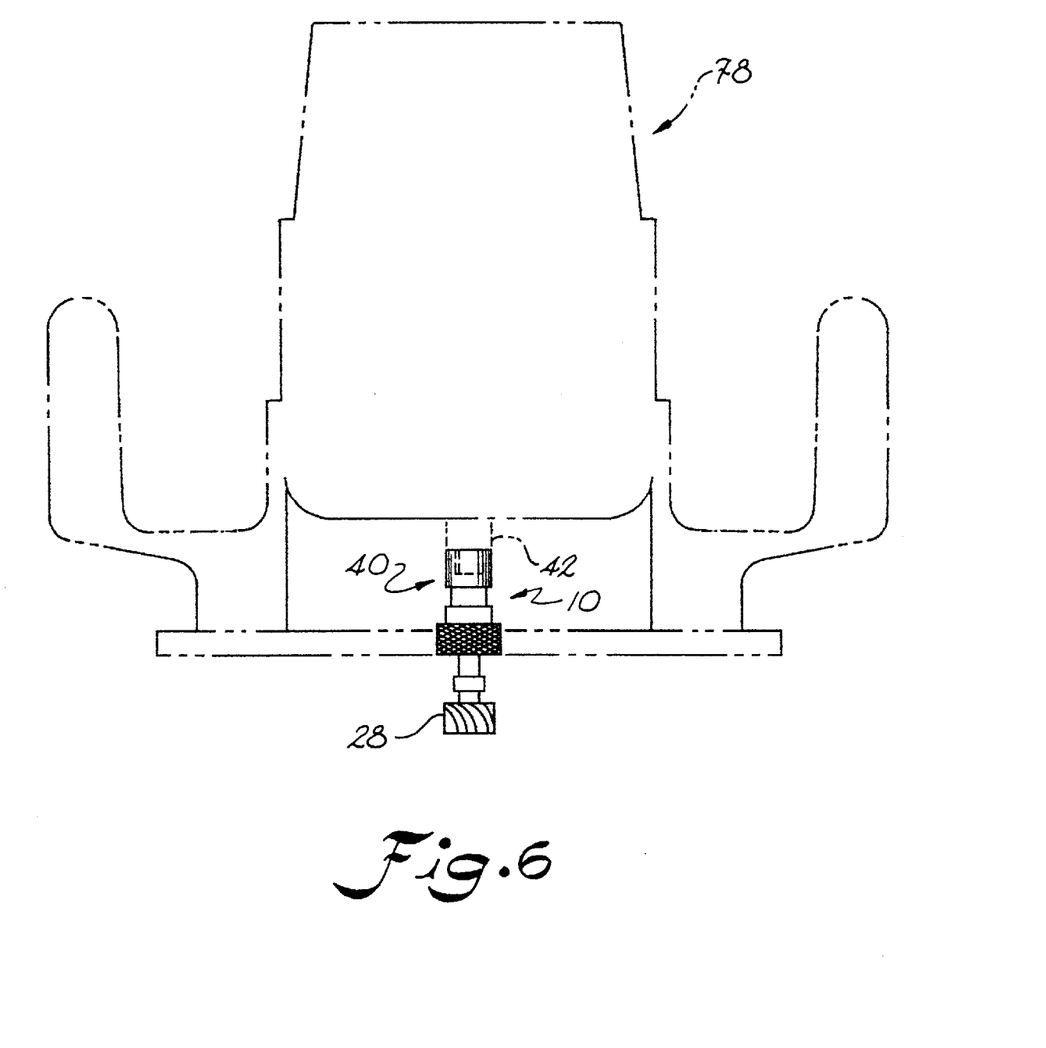
FIG. 6 is a respective view of the device mounted on a portable router.

A quick release integrated collet and chuck device, generally 10, is illustrated in FIG. 6 in one application wherein it is mounted to a drive spindle 42 of a router 78. Device 10 is used for holding a tool bit 28 relative to the drive shaft 42. It should be understood that the present invention has any number of uses, and may be used wherever it is desired to attach a tool bit to a drive spindle. However, the present invention is particularly useful in high speed applications, such as with routers, laminate trimmers, dry wall cutters, etc. It should be understood that the present description is in no way meant as a limitation of the field of use of the present device.

Figure 1:
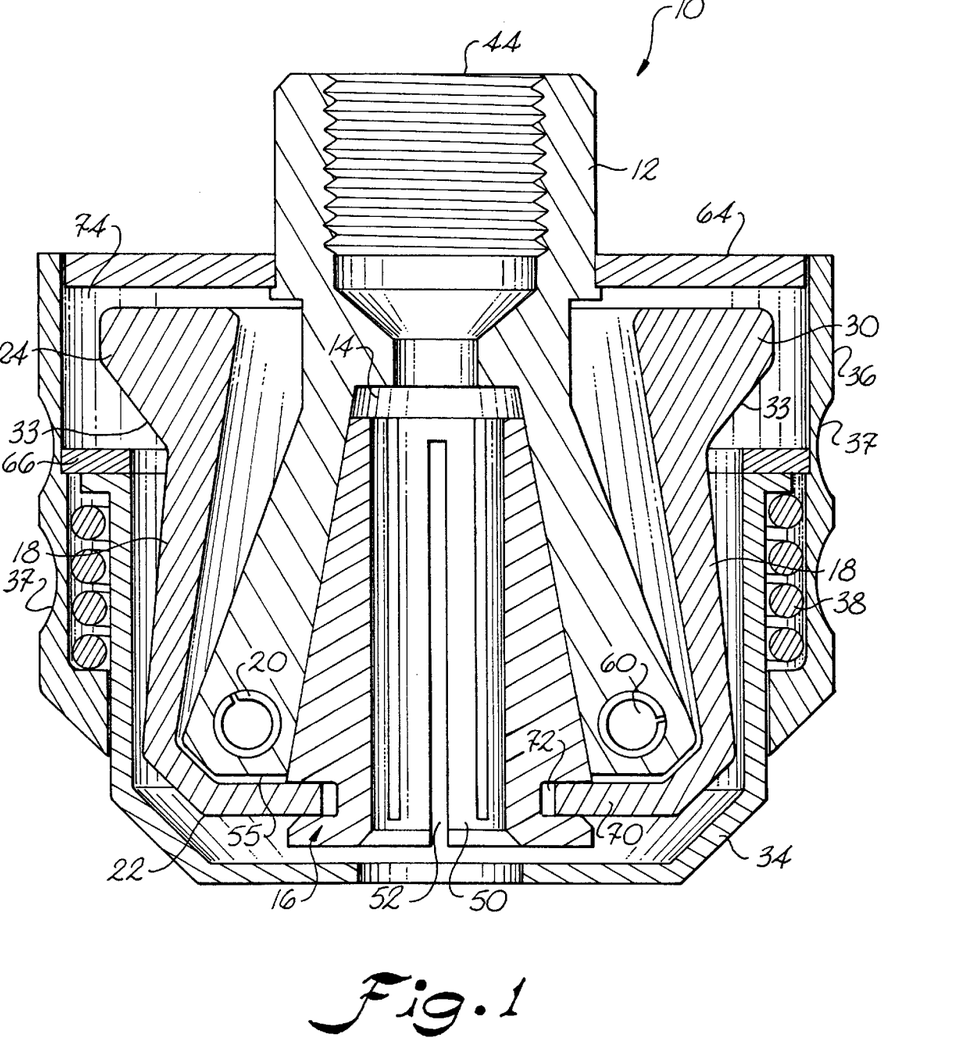
FIG. 1 is a cross-cut perspective view of an embodiment of the present invention.
Figure 5:
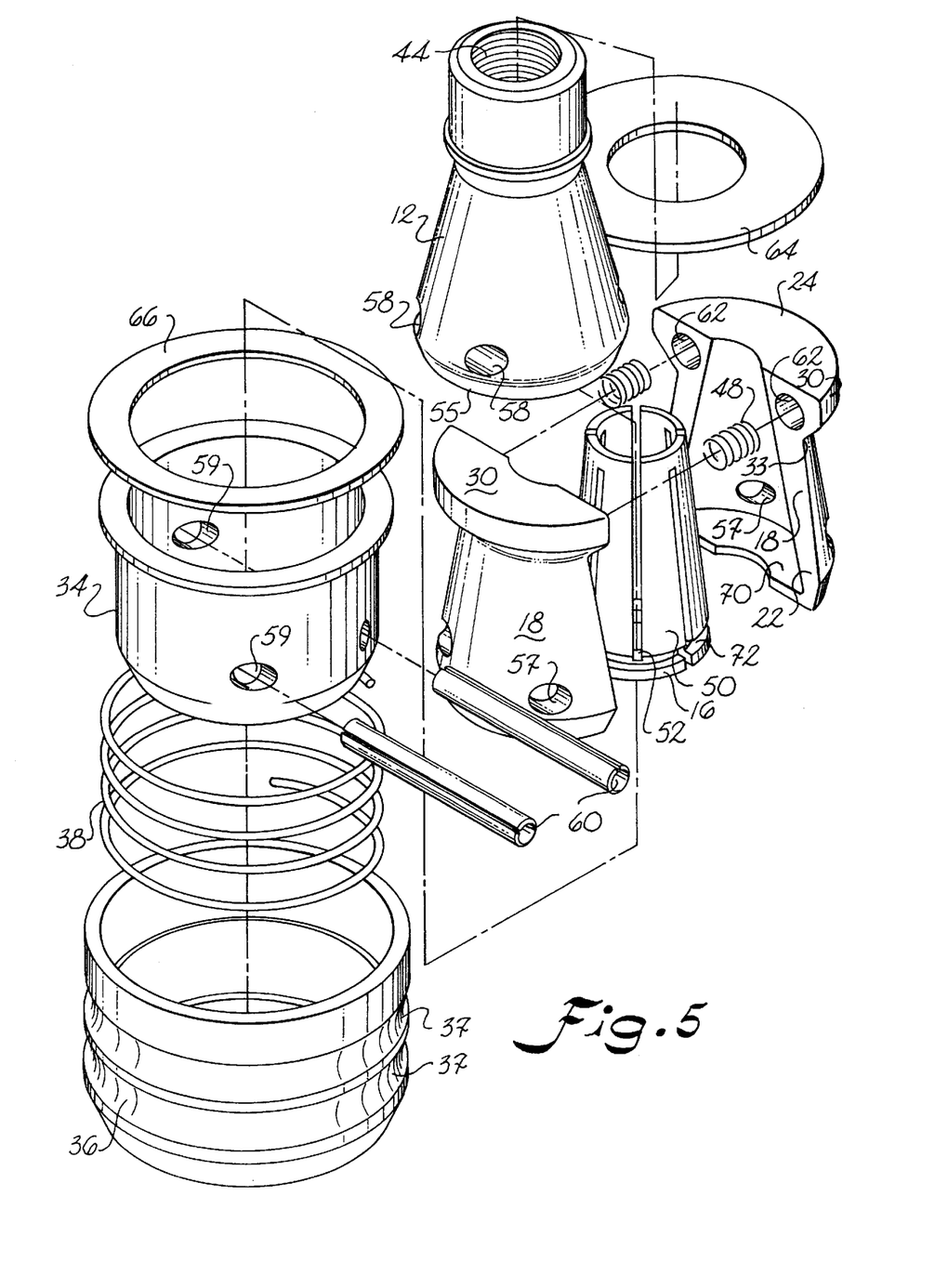
FIG. 5 is an in-line component view of the present device.

Device 10 includes a body member 12. Referring particularly to FIGS. 1 and 5, body member 12 is configured to be mounted to a drive spindle of a power tool, such as illustrated in FIG. 6. In this manner, body member 12 includes means for mounting to the drive spindle 42. In the embodiment illustrated, the mounting means includes a threaded receiving portion 44 for threaded engagement with the drive spindle. However, it should be understood, that any conventional mounting system may be utilized to mount body member 12 to drive spindle 42. For example, body member 12 could be attached by set screws, mechanical interlocks, screws for directly screwing the body member onto the drive shaft, or any other suitable mechanical locking means.

Figure 3:
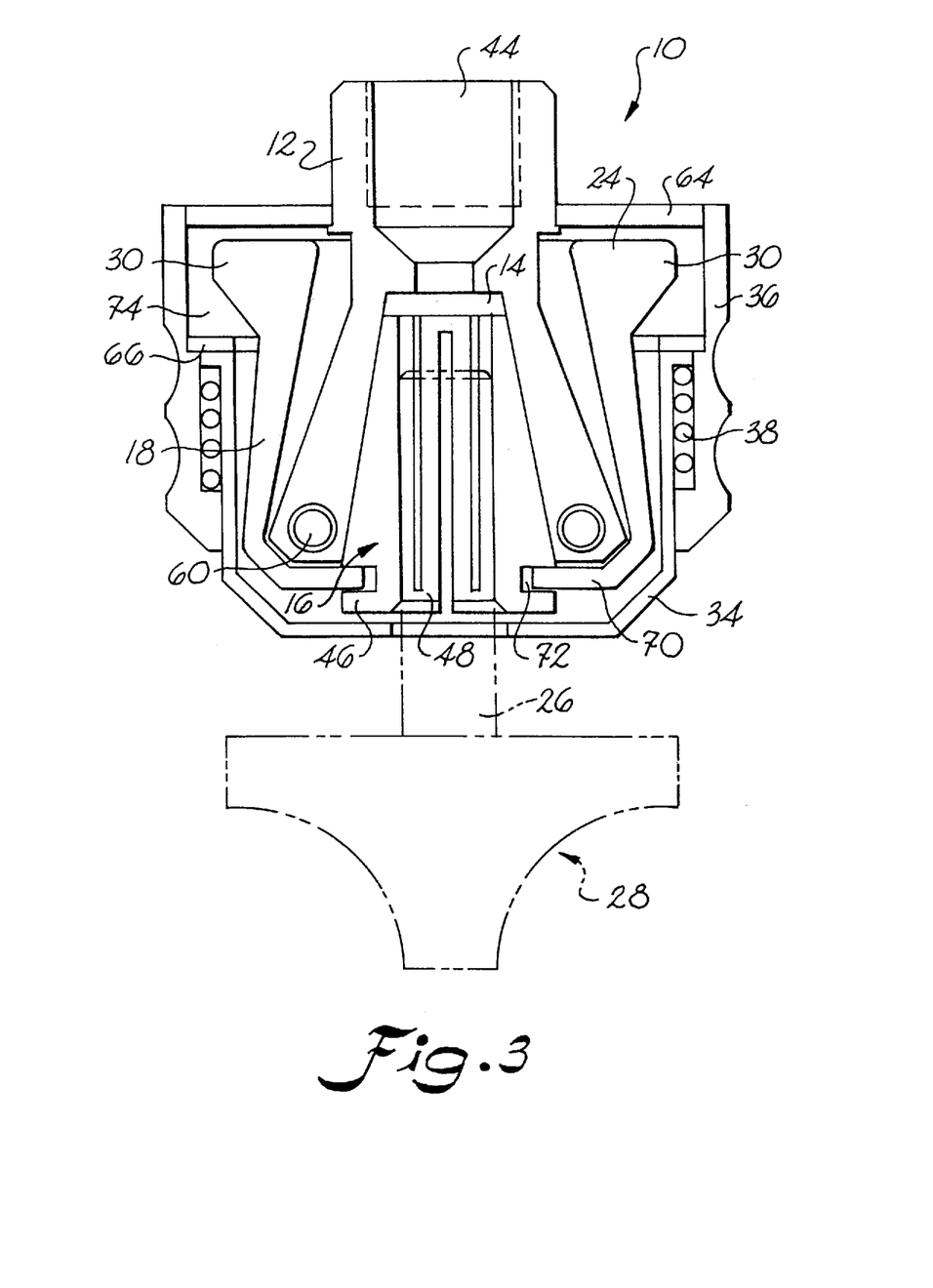
FIG. 3 is a further operational view particularly illustrating the tool bit being inserted into the chuck device.

Body member 12 includes a frustoconical chamber 14 defined therein. A collet device 16 is operably housed in chamber 14. Collet device 16 comprises a frustoconical outer diameter surface which compliments the frustoconical chamber 14. The operation of typical collets 16 is well understood by those in the art and need not be described in great detail herein. In general though, as collet 16 is moved longitudinally rearward within body member 12, the jaws of the collet are forced against the complimenting frustoconical surface of chamber 14 causing the jaws to collapse and grip a tool shank held within the collet. Any manner or make of conventional collet may be utilized with the present invention. For example, the typical split-steel collet may be utilized, as particularly shown in FIGS. 1 and 5. These well known split-steel collets are formed of a continuous metal member 50 having longitudinal slits 52 defined therein. An alternative embodiment of collet device 16 is illustrated in FIG. 3. This collet device is another well known collet comprising a plurality of individual longitudinally disposed gripping jaws 46 held in a spaced apart relation by resilient material 48 disposed between the jaws. The present invention is not limited to any particular type of collet device.

Referring again to FIGS. 1 and 5 in particular, device 10 includes at least two longitudinally extending members 18. Members 18 are disposed equally spaced around the circumference of body member 12. In the embodiment illustrated, only two members 18 are utilized and are spaced radially opposite each other. It should be understood that a greater number of members 18 could be utilized. For example, three such members could be utilized so long as they were equally spaced around the outer circumference of body member 12. Longitudinal members 18 are pivotally mounted to body member 12 generally near a first end 22 thereof. In the embodiment illustrated, members 18 are pivotally mounted by means of pivot pins 60 which extend through bores 7 defined in longitudinal members 18 and bores 58 defined in body member 12. First ends 22 of longitudinally extending members 18 extend beyond the front face 55 of body member 12 and include a tab or annular ridge section 70. As particularly shown in FIG. 1, annular ridge or tab 70 extends into a groove 72 defined in collet device 16.

Members 18 extend longitudinally rearward relative to body member 12 and include a second end 24. Second end 24 is moveable radially outward away from body member 12 due to centrifugal force as body member 12 is rotated. When body member 12 rotates, ends 24 of longitudinal members 18 are caused to move radially away from body member 12 as the longitudinal members 18 pivot relative to pivot point 20 located nearer to the first ends 22 of the longitudinal members 18. The second ends 24 of the longitudinal members preferably comprise a weighted portion or section 30, as generally shown in FIGS. 1 and 5. Weighted portion 30 is preferably formed as an integral part of longitudinal members 18. The weighted sections 30 enhance the pivoting action of the longitudinal members and thereby increase the gripping strength of the device. However, it should be understood, that pivoting members 18 will pivot even without the weighted sections due to the location of the pivot points 20 nearer to the first ends 22.

Spring members 48 are preferably disposed in oppositely facing recesses 62 defined in longitudinal members 18. Spring members 48 impart an initial outward bias to ends 24 of longitudinally extending members 18 causing collet device 16 to be forced to at least some extent into frustoconical chamber 14. This configuration gives the device an initial degree of gripping strength to securely hold tool shank 26 within the device when the power tool, such as router 78 shown in FIG. 6, is stationary. As will be explained in greater detail below, longitudinally extending members 18 are manually moveable radially towards body member 12 against the biasing force of spring members 48.

In a preferred embodiment as illustrated in the figures, device 10 includes a spring biased outer sleeve member 36. Sleeve member 36 is spring biased in the longitudinal direction by means of a spring or other resilient member 38. In the embodiment illustrated, spring 38 is disposed around the circumference of a cap member 34 which is attached to body member 12 by way of pins 60 which extend through bores 59 defined in cap member 34. Thus, cap member 34 is held stationary relative to body member 12. Any number of mechanical means or configurations can be utilized to hold a body or cap member 34 stationary relative to body member 12.

Preferably, outer sleeve member 36 is formed of a relatively aesthetically pleasing material, such as a plastic material, and comprises gripping recesses 37 formed therein. A flange member 66 is press fitted or otherwise fixed inside of sleeve member 36 and is moveable therewith. An operator can grasp sleeve member 36 and pull the sleeve member rearward against the force of spring 38. As sleeve member 36 moves rearward, flange member 66 contacts the slanted section 33 defined in longitudinally extending member 18 and thereby causes end 24 of the longitudinally extending members 18 to move radially inward towards body member 12. This pivoting action causes the forward end 22 of the longitudinal members which extends beyond the front face 55 of body member 12 to move radially outward and forward in a circular pivoting motion. In this manner, tab or annular ring 70 engaging in groove 72 of collet device 16 pulls collet device 16 outward a limited degree from chamber 14. This action allows for a tool shank to be inserted into collet device 16.

It should be understood that flange member 66 may form an integral component of sleeve 36. It should also be understood that there are any number of possible configurations for spring biasing the sleeve member relative to the body 12 and cap 34.

A flange member 64 is press fitted or otherwise attached to body member 12. Sleeve member 36 is concentric about flange 64 and extends axially rearward beyond flange 64 when manually actuated.

Sleeve member 36 defines an annular space 74 in which end 24 of longitudinally extending members 18 can pivot in their circular arc away from body member 12 as the device is rotated. The range of movement of the ends of longitudinal members 18 is thus limited by the extent of annular space 74.

Figure 2:
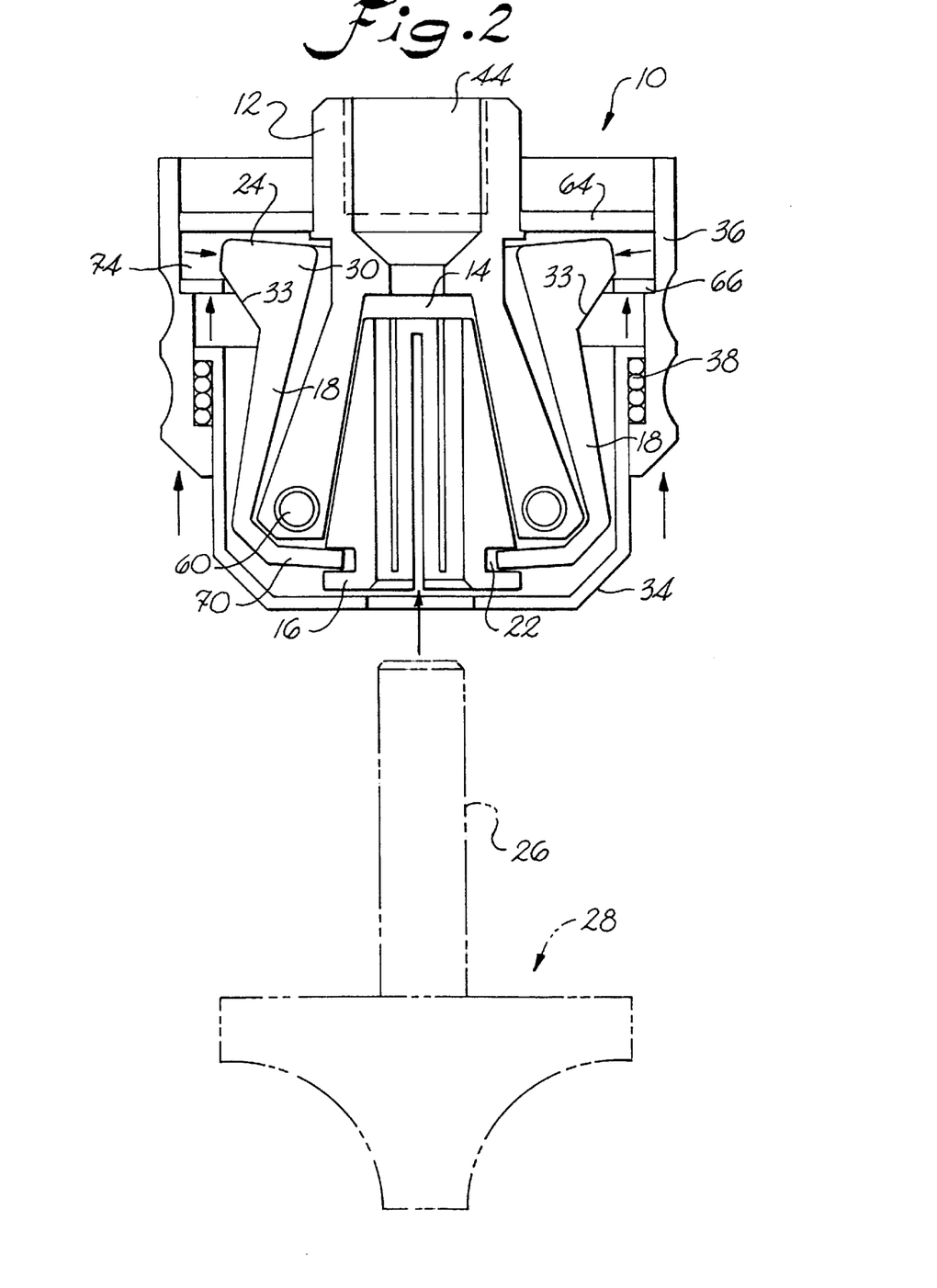
FIG. 2 is a cross-cut operational view of the device illustrated in FIG. 1 particularly illustrating the device prior to insertion of a tool bit.
Figure 4:
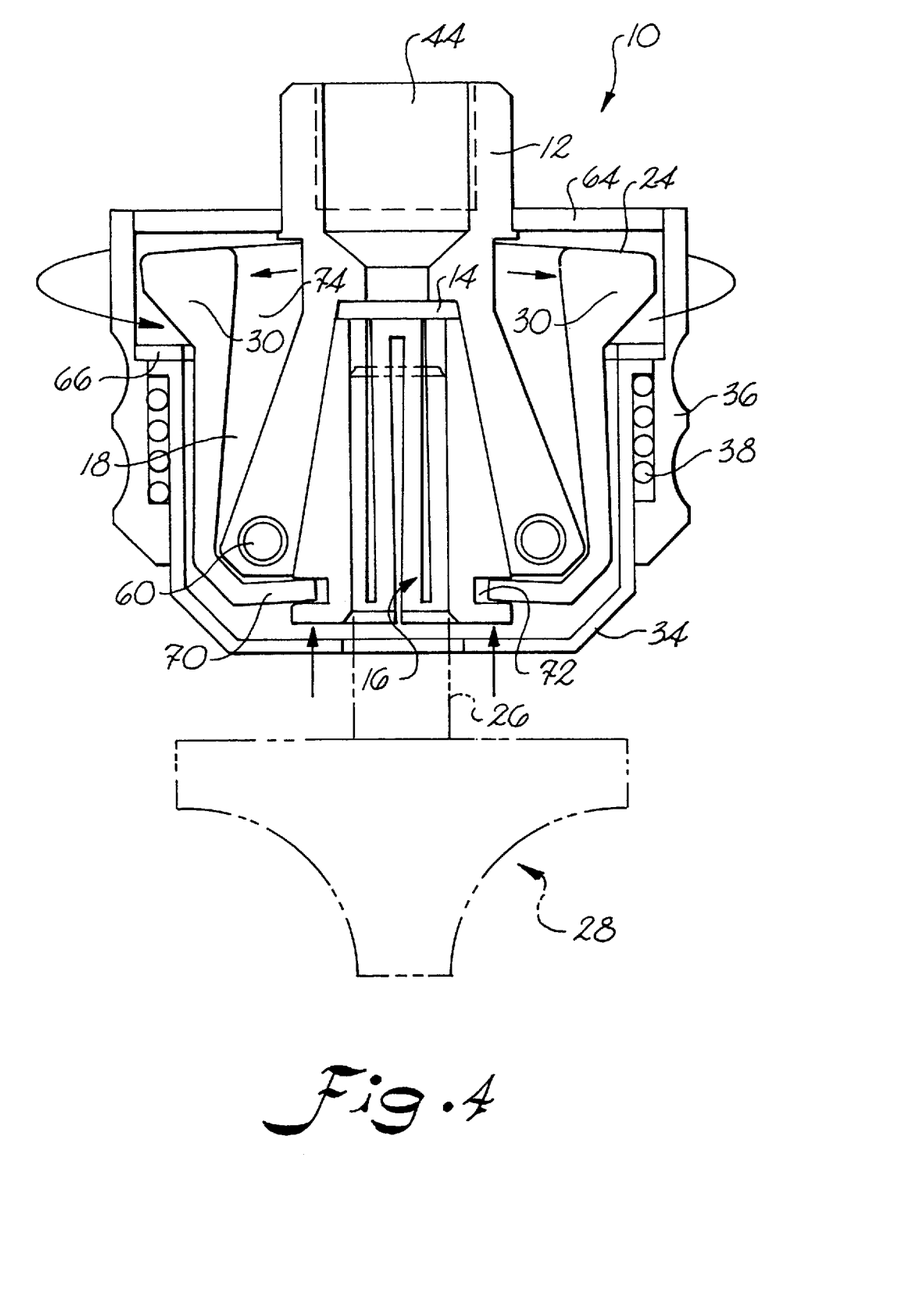
FIG. 4 is an operational cross-cut view of the device particularly illustrating operation of the longitudinally extending members as the body member is rotated.

Operation of device 10 is particularly illustrated in the sequential operational views of FIGS. 2 through 4.

FIG. 2 illustrates the device prior to insertion of shank 26 of tool bit 28 into collet device 16. As can be seen in the figure, sleeve member 36 has been pulled longitudinally rearward towards threaded section 44 of body member 12 and extends axially rearward beyond flange member 64. Flange member 66 is in contact with slanted surface 33 of members 18 and has forced ends 24 radially inward, as indicated by the arrows. Annular ridge or tab 70 is pivoted radially outward and forward and, through engagement in groove 72, causes collet device 16 to be pulled at least some degree out of frustoconical chamber 14. This action allows for easy insertion of tool bit 28 into device 10.

FIG. 3 illustrates device 10 after tool bit 28 has been inserted into the device. Although not seen in this view of the device, spring 48 (FIG. 5) impart an initial outward bias to members 18, as discussed above, so that collet device 16 will securely hold tool bit 28 therein without rotation of body member 12.

FIG. 4 shows an operational view of the device 10 and particularly illustrates the device in its rotational mode as it would be driven by the drive spindle of a power tool. As body member 12 rotates, ends 24 of longitudinally extending members 18 are forced radially outward within annular recess 74 as members 18 pivot about pins 60. This action causes the annular ridge or tab 70 to pivot radially inward and rearward in a circular arc thereby forcing collet device 16 further into frustoconical chamber 14. As collet device 16 moves rearward within chamber 14, the gripping jaws or members of the collet collapse and grip on shank 26 of tool bit 28, as is commonly understood in the art.

Figure 7:
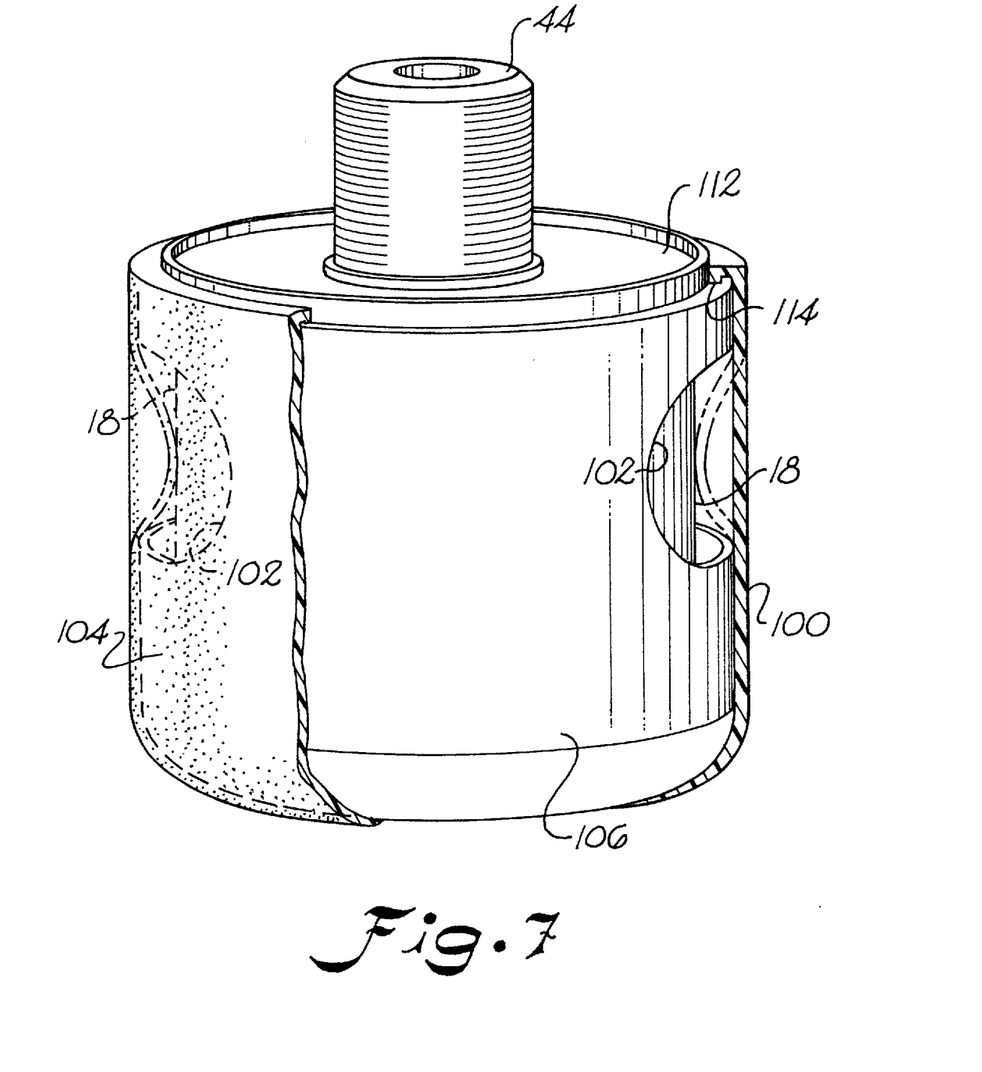
FIG. 7 is perspective view of the device incorporating an alternative embodiment of the sleeve member.
Figure 8:
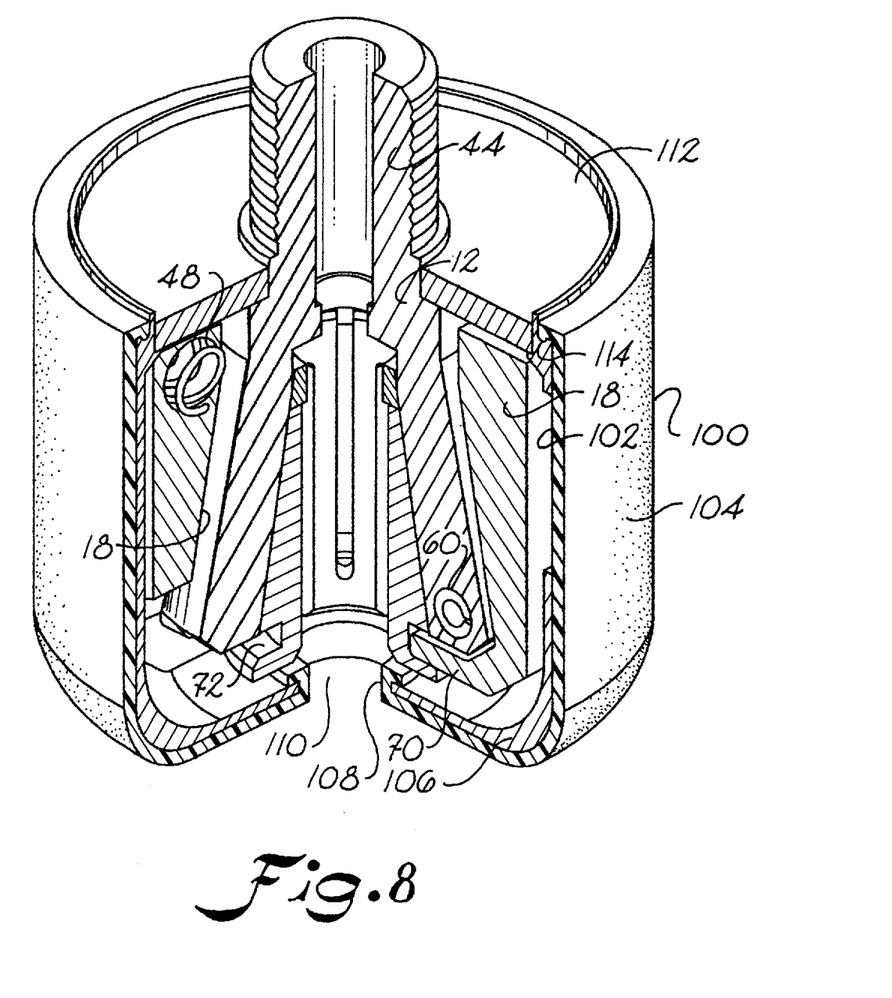
FIG. 8 is a partial cross-cut view of the device shown in FIG. 7.

An alternative embodiment of the device is illustrated in FIGS. 7 and 8. In particular, an alternative configuration of the sleeve member is illustrated. In this embodiment, sleeve member 100 is not spring biased relative to body member 12, but surrounds longitudinally extending members 18 and is axially fixed. Sleeve member 100 includes access openings 102 defined therein which provide access to members 18. In the embodiment illustrated, sleeve member 100 is formed by a substantially rigid cap member 106 which is fitted onto flange member 112 by a press fit or other appropriate means. Flange member 112 may be press fitted onto body member 12 or formed integral therewith.

Sleeve member 100 also preferably includes a resilient material covering 104 surrounding cap member 106. Resilient material 104 can be adhered to cap member 106 or comprise a removable covering attached by means of a lip 114 or other suitable means.

Sleeve member 100 also preferably includes a sealing device 108 to seal against a tool shank inserted into the device. Any conventional sealing device or member can be utilized in this regard. In the embodiment illustrated, sealing device 108 is configured as an extension of cap member 106 and resilient material 104 that extend radially inward into opening 110 defined through sleeve member 100.

In operation of the device illustrated in FIGS. 7 and 8, an operator simply manually squeezes longitudinally extending members 18 radially inward by depressing resilient material covering 104 at access openings 102. This action allows the operator to easily insert or remove a tool shank into the device. The subsequent operation of the device is as described above.

The present invention is suited for any manner of machine tool wherein a tool bit must be rotationally driven. The device is particularly suited for applications wherein relatively great rotational speeds are desired such as with routers and laminate trimmers. However, this is in no means a limitation of the invention. In fact, it will be apparent to those skilled in the art that various modifications and variations can be made in the apparatus of the present invention without departing from the scope or spirit of the invention. Thus, it is intended that the present invention cover the modifications and variations of this invention provided they come within the scope of the appended claims and their equivalents.

What is claimed is:

1. A quick release chuck device, comprising:
   a body member;
   a frustoconical chamber defined in said body member;
   a collet device operably housed in said frustoconical chamber;
   at least two longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device; and
   said first ends of said longitudinal members engaging said collet device at a forward end thereof axially forward of said pivot points and pushing said collet device axially rearward into said frustoconical chamber when said second ends move radially outward thereby causing said collet device to grip a tool shank carried therein.

2. The device as in claim 1, wherein said second ends of said longitudinally extending members comprise a weighted portion so that said second ends have a greater weight than said first ends.

3. The device as in claim 2, wherein said weighted ends are formed integral with said longitudinally extending members.

4. The device as in claim 1, comprising two said longitudinally extending members spaced radially opposite each other relative to said body member.

5. The device as in claim 1, wherein said body member comprises means for mounting said body member to a drive spindle of a driving tool.

6. The device as in claim 5, wherein said mounting means comprises a threaded receiving section defined in an end of said body member for threaded engagement with said drive spindle.

7. The device as in claim 1, wherein said collet device comprises a plurality of individual gripping members disposed radially equally spaced about a centerline axis and held in a resilient material.

8. The device as in claim 1, wherein said collet device comprises a continuous metal member having longitudinal slits defined therein.

9. The device as in claim 1, wherein said device is configured as a router chuck.

10. A quick release chuck device, comprising:
    a body member having means for mounting to a drive spindle of a drive tool;
    a frustoconical chamber defined in said body member and a collet device operably housed in said frustoconical chamber;
    longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device, said second ends comprising a weighted portion;
    said first ends of said longitudinal members engaging said collet device and forcing said collet device longitudinally into said frustoconical chamber when said second ends move radially outward thereby causing said collet device to grip a tool shank carried therein;
    spring members operably disposed between said longitudinally extending members and said body member so as to impart an initial radially outward bias to said second ends of said longitudinally extending members; and
    a spring biased sleeve member disposed about said body member and said longitudinally extending members, said sleeve member manually movable relative to said body member so as to contact and move said longitudinally extending members radially inward against the force of said spring members to allow a tool shank to be inserted into said collet device.

11. A quick release chuck device, comprising:
    a body member having means for mounting to a drive spindle of a drive tool;
    a frustoconical chamber defined in said body member and a collet device operably housed in said frustoconical chamber;
    longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device, said second ends comprising a weighted portion;
    said first ends of said longitudinal members engaging said collet device and forcing said collet device longitudinally into said frustoconical chamber when said second ends move radially outward thereby causing said collet device to grip a tool shank carried therein;
    spring members operably disposed between said longitudinally extending members and said body member so as to impart an initial radially outward bias to said second ends of said longitudinally extending members; and
    a sleeve member disposed over said longitudinally extending members, said sleeve member having access openings defined therein to provide access for an operator to manually squeeze said longitudinally extending members radially inward to insert a tool shank into said device, said sleeve member further comprising a covering of resilient material at least covering said access openings.

12. A quick release chuck device, comprising:
    a body member;
    a frustoconical chamber defined in said body member;
    a collet device operably housed in said frustoconical chamber;
    at least two longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device;

said first ends of said longitudinal members engaging said collet device and forcing said collet device longitudinally into said frustoconical chamber when said second ends move radially outward thereby causing said collet device to grip a tool shank carried therein; and a sleeve member longitudinally movable relative to said body member, said sleeve member comprising a surface for contacting said longitudinally extending members as said sleeve member is manually moved relative to said body member thereby causing said longitudinally extending members to move radially towards said body member so that a tool shank can be inserted into said collet device.

13. The device as in claim 12, further comprising a cap member fixed to said body member and coaxial with said sleeve member over a limited range, and a resilient member operably disposed relative to said cap member and said sleeve member so that said sleeve member is movable longitudinally relative to said body member and said cap member against the force of said resilient member.

14. A quick release chuck device, comprising:

a body member;

a frustoconical chamber defined in said body member;

a collet device operably housed in said frustoconical chamber;

at least two longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device;

said first ends of said longitudinal members engaging said collet device and forcing said collet device longitudinally into said frustoconical chamber when said second ends move radially outward thereby causing said collet device to grip a tool shank carried therein; and resilient members operably disposed between said longitudinally extending members and said body member so as to provide an initial radially outward bias to said second ends of said longitudinally extending members, said longitudinally extending members manually movable against the force of said resilient members to insert a tool shank into said collet device.

15. The device as in claim 14, further comprising a axially biased sleeve member disposed about said longitudinally extending members, said sleeve member being manually movable relative to said body member and contacting and forcing said longitudinally extending members radially inward upon movement thereof.

16. A quick release chuck device, comprising:

a body member;

a frustoconical chamber defined in said body member;

a collet device operably housed in said frustoconical chamber;

at least two longitudinally extending members disposed equally spaced around the circumference of said body member, said longitudinally extending members pivotally mounted relative to said body member at pivot points generally nearer a first end of said members, said longitudinally extending members having a second end opposite said first end wherein said second ends are movable radially outward from said body member as said body member is rotated in an operational mode of said chuck device;

said first ends of said longitudinal members engaging said collet device and forcing said collet device longitudinally into said frustoconical chamber when said second ends move radially outward thereby causing said collet device to grip a tool shank carried therein; and a sleeve member disposed about said longitudinally extending members, said sleeve member having access openings to said longitudinally extending members for an operator to manually squeeze said longitudinally extending members radially inward in order to insert a tool shank into said device.

17. The device as in claim 16, wherein said sleeve member further comprises a resilient material covering at least said access openings.

18. The device as in claim 16, wherein said sleeve member comprises a substantially rigid cap surrounded by a resilient material.

19. The device as in claim 16, wherein said sleeve member further comprises a sealing device configured to seal against a tool shank inserted into said device.

20. The device as in claim 19, wherein said sealing device comprises a resilient material surrounding a cap member, said resilient material extending radially inward into an opening defined in said cap member for receipt of a tool shank therethrough.

* * * * *